United States Patent
Gross et al.

(10) Patent No.: US 7,934,123 B2
(45) Date of Patent: Apr. 26, 2011

(54) PROLONGING THE REMAINING USEFUL LIFE OF A POWER SUPPLY IN A COMPUTER SYSTEM

(75) Inventors: Kenny C. Gross, San Diego, CA (US); Aleksey M. Urmanov, San Diego, CA (US); Anton A. Bougaev, La Jolla, CA (US)

(73) Assignee: Oracle America, Inc., Redwood Shores, CA (US)

( * ) Notice: Subject to any disclaimer, the term of this patent is extended or adjusted under 35 U.S.C. 154(b) by 257 days.

(21) Appl. No.: 12/205,416

(22) Filed: Sep. 5, 2008

(65) Prior Publication Data

US 2010/0064170 A1 Mar. 11, 2010

(51) Int. Cl.
*G06F 11/00* (2006.01)
(52) U.S. Cl. ............................................. 714/22; 714/14
(58) Field of Classification Search ........................ None
See application file for complete search history.

(56) References Cited

U.S. PATENT DOCUMENTS

| | | | | |
|---|---|---|---|---|
| 5,781,448 | A * | 7/1998 | Nakamura et al. | 700/293 |
| 7,134,029 | B2 * | 11/2006 | Hepner et al. | 713/300 |
| 7,363,519 | B2 * | 4/2008 | Liebenow | 713/300 |
| 2003/0226049 | A1 * | 12/2003 | Mantani | 713/322 |
| 2005/0229037 | A1 * | 10/2005 | Egan et al. | 714/14 |
| 2007/0028129 | A1 * | 2/2007 | Schumacher et al. | 713/320 |
| 2007/0028130 | A1 * | 2/2007 | Schumacher et al. | 713/320 |
| 2007/0226539 | A1 * | 9/2007 | May | 714/14 |
| 2009/0217065 | A1 * | 8/2009 | Araujo, Jr. | 713/320 |

* cited by examiner

*Primary Examiner* — Michael C Maskulinski
(74) *Attorney, Agent, or Firm* — Park, Vaughan, Fleming & Dowler LLP

(57) ABSTRACT

Some embodiments of the present invention provide a system that prolongs a remaining useful life of a power supply in a computer system. First, performance parameters of the power supply are monitored. Next, the remaining useful life of the power supply is predicted based on the monitored performance parameters. Then, an operational regime of the power supply is adjusted based on the predicted remaining useful life to prolong the remaining useful life.

18 Claims, 2 Drawing Sheets

PROLONGING THE REMAINING USEFUL LIFE OF A POWER SUPPLY IN A COMPUTER SYSTEM

BACKGROUND

1. Field

The present invention generally relates to techniques for controlling the operation of a computer system. More specifically, the present invention relates to a method and an apparatus that prolongs the remaining useful life of a power supply in a computer system.

2. Related Art

The failure of a power supply in a computer system can cause the entire computer system to fail. Typically, in order to reduce the chance that a power supply failure will result in a failure of the entire computer system, some computer systems are designed to include at least one extra power supply. With the redundancy provided by an extra power supply, one power supply can fail and a service call can be scheduled to replace it while the computer system keeps operating. However, even the failure of a single power supply in a system with redundant power supplies can potentially cause problems if the logic removing the failed power supply from the computer system induces electrical transients.

Additionally, the computer system may still fail if a second power supply fails before the first failed power supply can be replaced. For mission-critical computer systems, even this small chance that two power supplies may fail can be too high. Also, although predicting the remaining useful life of the power supplies in the computer system may help a computer system operator to determine how quickly a service call is needed, even this knowledge may not help to avoid a failure of the computer system if the service call or required spare parts cannot be obtained in time.

Hence, what is needed is a method and system that prolongs a remaining useful life of a power supply in a computer system without the above-described problems.

SUMMARY

Some embodiments of the present invention provide a system that prolongs a remaining useful life of a power supply in a computer system. First, performance parameters of the power supply are monitored. Next, the remaining useful life of the power supply is predicted based on the monitored performance parameters. Then, an operational regime of the power supply is adjusted based on the predicted remaining useful life to prolong the remaining useful life.

In some embodiments, monitoring performance parameters includes systematically monitoring and recording a set of performance parameters, wherein the recording process keeps track of the temporal relationships between events in different performance parameters.

In some embodiments, adjusting the operational regime of the power supply includes adjusting the operational regime of the power supply until the predicted remaining useful life of the power supply is longer than a predetermined time.

In some embodiments, adjusting the operational regime of the power supply includes at least one of: minimizing a load on the power supply, and minimizing a cycling of the load on the power supply.

In some embodiments, adjusting the operational regime of the power supply includes adjusting an operational regime of the computer system in a manner which generates a change in the operational regime of the power supply.

In some embodiments, adjusting the operational regime of the computer system includes adjusting a power-management feature of the computer system.

Some embodiments further include monitoring performance parameters of a set of power supplies, wherein the power supply is in the set of power supplies, and power supplies in the set of power supplies are in computer systems in a set of computer systems. Next, the remaining useful life of power supplies in the set of power supplies is predicted based on the monitored performance parameters for the set of power supplies. Then, an operational regime of the power supply is adjusted based on the predicted remaining useful life of power supplies in the set of power supplies.

Some embodiments further include monitoring performance parameters of a set of power supplies, wherein the power supply is in the set of power supplies, and power supplies in the set of power supplies are in computer systems in a set of computer systems. Next, the remaining useful life of power supplies in the set of power supplies is predicted based on the monitored performance parameters for the set of power supplies. Then, a repair action for a power supply in the set of power supplies is prioritized based on the predicted remaining useful life of power supplies in the set of power supplies.

Some embodiments further include prioritizing the repair action based on at least one of: the number of available spare power supplies, the time required to replace the power supply, and a power requirement of computer systems in the set of computer systems.

In some embodiments, the performance parameters include at least one of: a temperature of the power supply, an input current of the power supply, an input voltage of the power supply, an output current of the power supply, an output voltage of the power supply, and a telemetric impulsional response fingerprint.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
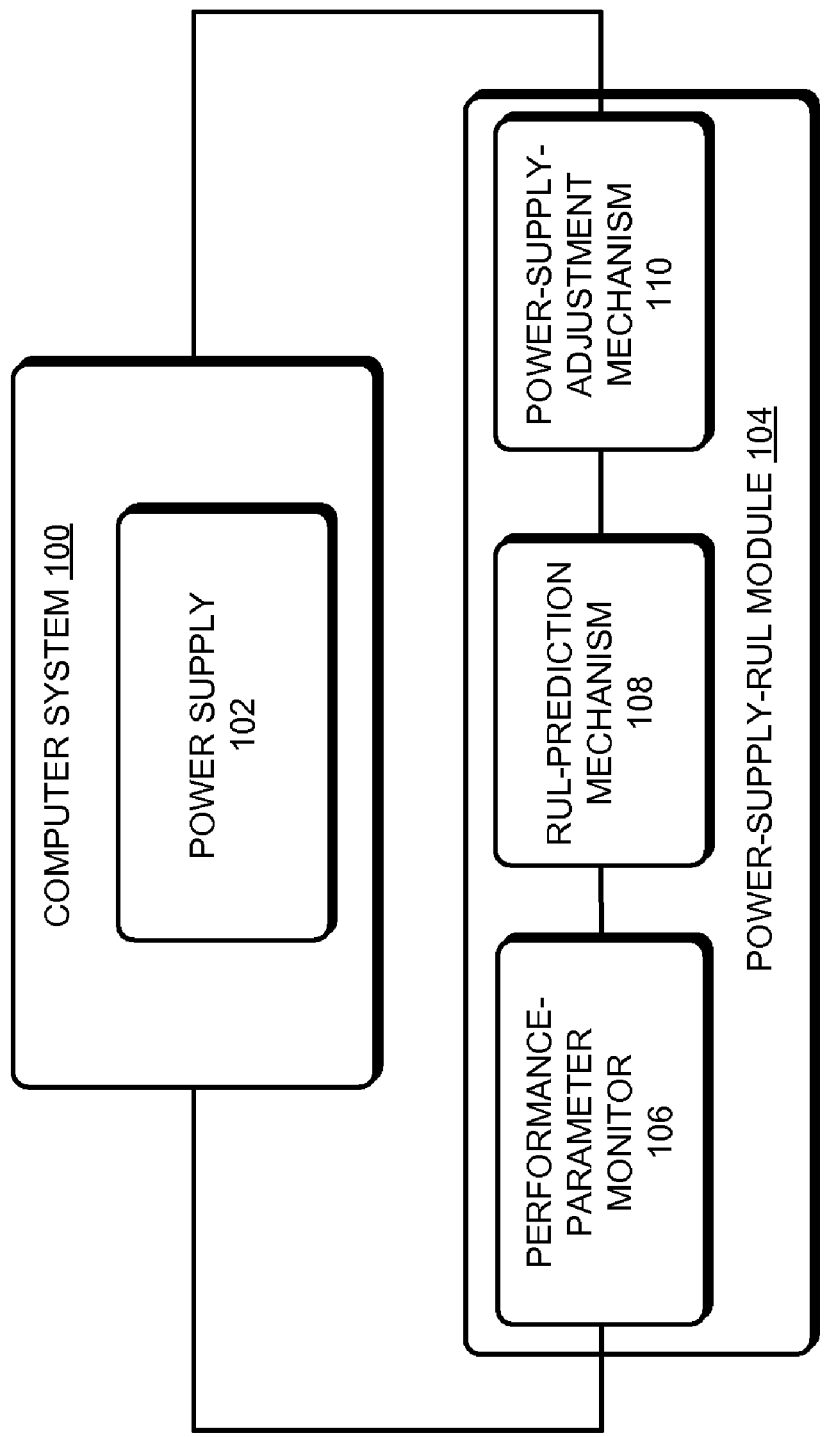
FIG. 1 represents a system that prolongs a remaining useful life of a power supply in a computer system in accordance with some embodiments of the present invention.

FIG. 1 represents a system that prolongs a remaining useful life of a power supply in a computer system in accordance with some embodiments of the present invention. Computer system 100 includes power supply 102. Additionally, power supply remaining-useful-life (RUL) module 104 is coupled to computer system 100. Power supply RUL module 104 includes performance-parameter monitor 106 coupled to RUL-prediction mechanism 108 which is coupled to power-supply-adjustment mechanism 110.

Computer system 100 can include but is not limited to a server, a server blade, a datacenter server, an enterprise computer, a field-replaceable unit that includes a processor, or any other computation system that includes one or more processors, one or more cores in each processor, and at least one power supply. In some embodiments, computer system 100 includes at least one more power supply than required to power computer system 100.

Power supply 102 can include any type of power supply, including but not limited to alternating current (AC) to direct current (DC), or DC to DC implemented in any type of technology now known or later developed.

Performance-parameter monitor 106 can be any device that can monitor performance parameters of a computer system. Performance parameters can include but are not limited to one or more of the following: input voltage to a power supply; input current to a power supply; input power to a power supply; output current from a power supply; output voltage from a power supply; output power from a power supply; acceleration of a power supply; speed of cooling fan in a power supply; a power supply temperature, including but not limited to a temperature of one or more internal components of the power supply; total on time of a power supply; total on time of a computer system; efficiency of a power supply; power cycles of a power supply; power cycles of a computer system; output load cycling of a power supply; the speed of other cooling fans in a computer system; loads in a computer system; processor frequency in a computer system; throughput variables in a computer system; transaction latencies in a computer system; time series of any performance parameter; and performance parameters for each processor, core, and power supply in a computer system. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference. Additionally, performance parameters can include but are not limited to a telemetric impulsional response fingerprint as set forth in a U.S. patent application entitled "Detecting a Failure Condition in a System Using Three-Dimensional Telemetric Impulsional Response Surfaces," by Aleksey M Urmanov, Anton A. Bougaev, and Kenny C. Gross, application Ser. No. 11/588,173, filed 26 Oct. 2006, which is hereby fully incorporated by reference. In some embodiments the telemetric impulsional response fingerprint is generated by computer system 100, performance-parameter monitor 106, and/or a separate computer system.

Performance-parameter monitor 106 can be implemented in any combination of hardware and software. In some embodiments, performance-parameter monitor 106 operates on computer system 100. In other embodiments, performance-parameter monitor 106 operates on one or more service processors. In still other embodiments, performance-parameter monitor 106 operates on a separate computer system. In some embodiments, performance-parameter monitor 106 includes a method or apparatus for monitoring and recording computer system performance parameters as set forth in U.S. Pat. No. 7,020,802.

RUL-prediction-mechanism 108 can be any device that can receive input from performance-parameter monitor 106 and predict a remaining useful life of a power supply in accordance with embodiments of the present invention. RUL-prediction-mechanism 108 can implement any method or apparatus now known or later developed to predict the remaining useful life of a power supply without departing from the present invention. In some embodiments, RUL-prediction-mechanism 108 implements a method and/or an apparatus that predicts the remaining useful life of a power supply as set forth in a U.S. patent application entitled "Method and Apparatus for Predicting Remaining Useful Life for a Computer System," by Kenny C. Gross, Keith A. Whisnant, and Aleksey M Urmanov, application Ser. No. 11/635,450, filed 6 Dec. 2006, which is hereby fully incorporated by reference. RUL-prediction-mechanism 108 can be implemented in any combination of hardware and software. In some embodiments, RUL-prediction-mechanism 108 operates on computer system 100. In other embodiments, RUL-prediction-mechanism 108 operates on one or more service processors. In other embodiments, RUL-prediction-mechanism 108 operates on a separate computer system. In yet other embodiments RUL-prediction-mechanism 108 operates on the same hardware as performance-parameter monitor 106.

Power-supply-adjustment mechanism 110 can be any device that can receive input from RUL-prediction-mechanism 108 and adjust an operational regime of a power supply in accordance with embodiments of the present invention. Power-supply-adjustment mechanism 110 can be implemented in any combination of hardware and software. In some embodiments, power-supply-adjustment mechanism 110 operates on computer system 100. In other embodiments, power-supply-adjustment mechanism 110 operates on one or more service processors. In other embodiments, power-supply-adjustment mechanism 110 operates on a separate computer system. In yet other embodiments power-supply-adjustment mechanism 110 operates on the same hardware as performance-parameter monitor 106, and/or RUL-prediction-mechanism 108.

In some embodiments, one or more of performance-parameter monitor 106, RUL-prediction-mechanism 108, and power-supply-adjustment mechanism 110 operate on a computer system in a separate location from computer system 100 and communicate with computer system 100 through a network that can include an intranet, one or more wireless links, and/or the internet.

Some embodiments of the present invention operate as follows: Performance-parameter monitor 106 monitors performance parameters of computer system 100 and sends them to RUL-prediction-mechanism 108. RUL-prediction-mechanism 108 then predicts a remaining useful life of power supply 102 based on the monitored performance parameters. The predicted remaining useful life is then sent to power-supply-adjustment mechanism 110. In some embodiments, power-supply-adjustment mechanism 110 adjusts an operational regime of the power supply if the predicted remaining useful life is below a predetermined remaining useful life threshold. In some embodiments, the predetermined remaining useful life threshold is based on information including one or more of the following: the timing of the next scheduled maintenance for computer system 100; the availability of spare parts, including spare power supplies for computer system 100; and the remaining service life of computer system 100. In some embodiments, the predetermined remaining useful life threshold is updated through a network connection.

If the predicted remaining useful life is below the predetermined remaining useful life threshold, then power-supply-adjustment mechanism 110 adjusts an operational regime of the power supply based on the predicted remaining useful life in order to increase the predicted remaining useful life. In some embodiments, RUL-prediction-mechanism 108 identifies a degradation mode in power supply 102 based on the monitored performance parameters. Power-supply-adjustment mechanism 110 then determines an adjustment to the operational regime of power supply 102 based on the degradation mode, and/or the predicted remaining useful life identified by RUL-prediction-mechanism 108. In some embodiments, power-supply-adjustment mechanism 110 adjusts an operational regime of the power supply based on the predicted remaining useful life in order to maximize the predicted remaining useful life.

In some embodiments, the adjustment to the operational regime of power supply 102 by power-supply-adjustment mechanism 110 can include but is not limited to adjustments of one or more of the following: output current from power supply 102; output voltage from power supply 102; output power from power supply 102; input voltage to power supply 102; input current to power supply 102; input power to power supply 102; speed of cooling fan in power supply 102; total on time of power supply 102; total on time of computer system 100; power cycles of power supply 102; power cycles of computer system 100; output load cycling of power supply 102; the speed of other cooling fans in computer system 100; loads in computer system 100; processor frequency in computer system 100; and a power management feature of computer system 100 including but not limited to one or more of: chip clock throttling, disabling memory modules, and disabling cores in multiprocessor systems.

In some embodiments, after power-supply-adjustment mechanism 110 has adjusted the operational regime of power supply 102, RUL-prediction mechanism 108 generates another prediction of the remaining useful life of power supply 102 based on monitored performance parameters and compares the predicted remaining useful life of power supply 102 to the predetermined remaining useful life threshold. Based on this comparison, power-supply-adjustment mechanism 110 determines if another adjustment to the operational regime of the power supply should be made to increase the remaining useful life of the power supply. In some embodiments, this cycle continues until the predicted remaining useful life is at or above the predetermined remaining useful life threshold, or power supply adjustment mechanism determines that the remaining useful life of power supply 102 can no longer be increased.

For example, in some embodiments, computer system 100 has N power supplies, and each power supply supplies 1/N of the power required to run computer system 100. If RUL-prediction-mechanism 108 determines that one of the power supplies has a predicted remaining useful life below the predetermined remaining useful life threshold set for computer system 100, then power-supply-adjustment mechanism 110 reduces the fraction of the total computer system power supplied by the power supply at issue, and the remaining power supplies supply the balance of the power required to operate computer system 100. Power-supply-adjustment mechanism 110 then continuously adjusts the power supplied by each of the power supplies to increase the remaining useful life of the power supplies. In some embodiments, power-supply-adjustment mechanism 110 adjusts the operational regime of all N power supplies to maximize the remaining useful life of the N power supplies based on information including but not limited to: the timing of the next service call, and the operational requirements of computer system 100.

In some embodiments, the adjustments to the operational regime of power supply 102 generated by power-supply-adjustment mechanism 110 can be rejected by computer system 100. In some embodiments, computer system 100 can reject an adjustment to the operational regime of power supply 102 if computer system 100 determines that the adjustment will alter the performance, reliability, efficiency, and/or any other parameter of computer system 100 in an undesirable way. For example, computer system 100 may reject an adjustment from power-supply-adjustment mechanism 110 because the recommended adjustment reduces the maximum allowable processor speed below a predetermined performance threshold for computer system 100.

In some embodiments, power-supply-adjustment mechanism 110 schedules a service call for power supply 102 based on the predicted remaining useful life for power supply 102. In some embodiments, power-supply-adjustment mechanism 110 schedules a service call for power supply 102 based on information including but not limited to one or more of the following: the remaining useful life of power supply 102; the amount by which the remaining useful life of power supply 102 can be extended by power-supply-adjustment mechanism 110; the adjustments to the operational regime of power supply 102 by power-supply-adjustment mechanism 110; the impact of the adjustments to power supply 102 on the performance of computer system 100; the acceptance or rejection by computer system 100 of one or more adjustments; the number of immediately available spare power supplies; and the timing of the availability of spare power supplies.

In some embodiments, performance-parameter monitor 106 monitors performance parameters for more than one computer system, RUL-prediction-mechanism 108 predicts the remaining useful life for more than one computer system, and power-supply-adjustment mechanism 110 adjusts the operational regime for power supplies in more than one computer system in accordance with embodiments of the present invention. In some of these embodiments, when power supplies in two or more computer systems are determined by RUL-prediction-mechanism 108 to have a predicted remaining useful life less than a predetermined remaining useful life threshold, then power-supply-adjustment mechanism 110 prioritizes repair actions for the two or more power supplies based on information including but not limited to one or more of the following: the remaining useful life of each power supply; the amount by which the remaining useful life of each power supply can be extended by power-supply-adjustment mechanism 110; the adjustments to the operational regime for each power supply by power-supply-adjustment mechanism 110; the impact of the adjustments to each power supply on the performance of the computer system powered by each power supply; the number of immediately available spare power supplies; and the timing of the availability of spare power supplies.

For example, in some embodiments, two computer systems each have one extra (redundant) power supply and there is one spare power supply on site. If one power supply in each computer system fails, power-supply-RUL module 104 adjusts the remaining useful life for the remaining power supplies in each computer system, prioritizing which computer system should receive the on-site spare power supply. Power-supply-RUL module 104 determines the prioritization based on which computer system's power supply can have its operational regime adjusted by power-supply-RUL module 104 to have the highest confidence factor of surviving until another spare power supply can be obtained.

In some embodiments, separate power-supply-RUL modules, each operating with one or more computer systems, communicate with each other in order to prioritize which of the power supplies whose operational regime is being adjusted requires the most immediate attention.

Figure 2:
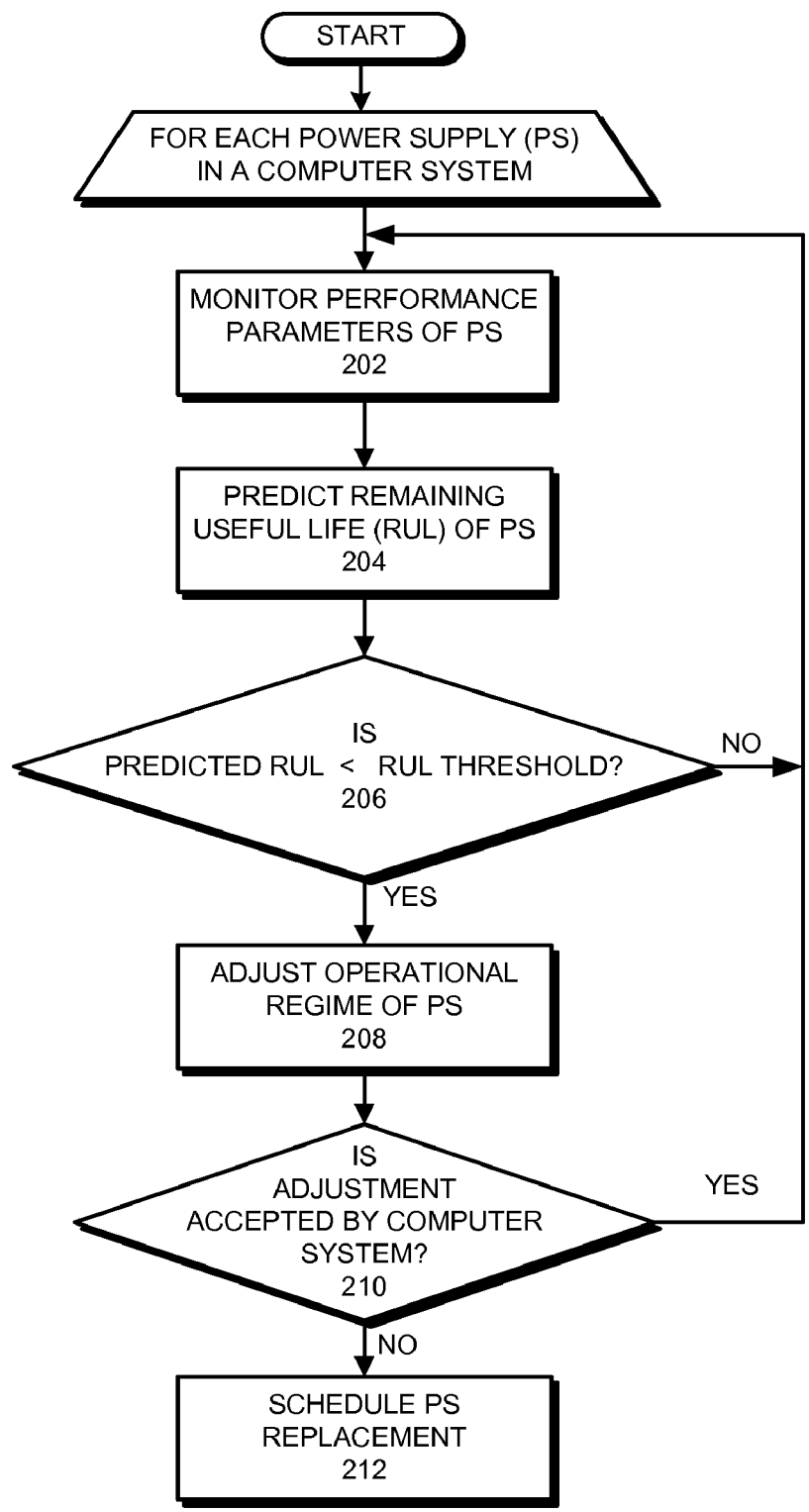
FIG. 2 presents a flowchart illustrating a process for prolonging a remaining useful life of a power supply in a computer system in accordance with some embodiments of the present invention.

FIG. 2 presents a flowchart illustrating a process for prolonging a remaining useful life of a power supply in a computer system in accordance with some embodiments of the present invention. For each power supply in a computer system the following process is performed. First, performance parameters of a power supply are monitored (step 202). Next, the remaining useful life of the power supply is predicted (step 204). Then, if the predicted remaining useful life is not less than a predetermined remaining useful life threshold (step 206), the process returns to step 202. If the predicted RUL is less than the predetermined remaining useful life threshold (step 206), then the operational regime of the power supply is adjusted (step 208). If the adjustment is accepted by the computer system (step 210), then the process returns to step 202. If the adjustment is not accepted by the computer system (step 210), then the power supply is scheduled for replacement (step 212).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for prolonging a remaining useful life of a power supply in a computer system, the method comprising:
monitoring performance parameters of the power supply;
predicting the remaining useful life of the power supply based on the monitored performance parameters; and
adjusting an operational regime of the power supply based on the predicted remaining useful life to prolong the remaining useful life;
wherein monitoring performance parameters includes systematically monitoring and recording a set of performance parameters, and wherein recording the set of performance parameters involves keeping track of temporal relationships between events in different performance parameters.

2. The method of claim 1, wherein:
adjusting the operational regime of the power supply includes adjusting the operational regime of the power supply until the predicted remaining useful life of the power supply is longer than a predetermined time.

3. The method of claim 1, wherein adjusting the operational regime of the power supply includes at least one of: minimizing a load on the power supply, and minimizing a cycling of the load on the power supply.

4. The method of claim 1, wherein adjusting the operational regime of the power supply includes adjusting an operational regime of the computer system in a manner which generates a change in the operational regime of the power supply.

5. The method of claim 1, further including:
monitoring performance parameters of a set of power supplies, wherein the power supply is in the set of power supplies, and power supplies in the set of power supplies are in computer systems in a set of computer systems;
predicting the remaining useful life of power supplies in the set of power supplies based on the monitored performance parameters for the set of power supplies; and
adjusting an operational regime of the power supply based on the predicted remaining useful life of power supplies in the set of power supplies.

6. The method of claim 5, further including:
monitoring performance parameters of a set of power supplies, wherein the power supply is in the set of power supplies, and power supplies in the set of power supplies are in computer systems in a set of computer systems;
predicting the remaining useful life of power supplies in the set of power supplies based on the monitored performance parameters for the set of power supplies; and
prioritizing a repair action for a power supply in the set of power supplies based on the predicted remaining useful life of power supplies in the set of power supplies.

7. The method of claim 6, further including prioritizing the repair action based on at least one of: the number of available spare power supplies, the time required to replace the power supply, and a power requirement of computer systems in the set of computer systems.

8. The method of claim 1, wherein the performance parameters include at least one of:
a temperature of the power supply;
an input current of the power supply;
an input voltage of the power supply;
an output current of the power supply;
an output voltage of the power supply; and
a telemetric impulsional response fingerprint.

9. A computer-readable storage medium storing instructions that when executed by a computer cause the computer to perform a method that prolongs a remaining useful life of a power supply in a computer system, the method comprising:
monitoring performance parameters of the power supply;
predicting the remaining useful life of the power supply based on the monitored performance parameters; and
adjusting an operational regime of the power supply based on the predicted remaining useful life to prolong the remaining useful life;
wherein monitoring performance parameters includes systematically monitoring and recording a set of performance parameters, and wherein recording the set of performance parameters involves keeping track of temporal relationships between events in different performance parameters.

10. The computer-readable storage medium of claim 9, wherein:
adjusting the operational regime of the power supply includes adjusting the operational regime of the power supply until the predicted remaining useful life of the power supply is longer than a predetermined time.

11. The computer-readable storage medium of claim 9, wherein adjusting the operational regime of the power supply includes at least one of: minimizing a load on the power supply, and minimizing a cycling of the load on the power supply.

12. The computer-readable storage medium of claim 9, wherein adjusting the operational regime of the power supply includes adjusting an operational regime of the computer system in a manner which generates a change in the operational regime of the power supply.

13. The computer-readable storage medium of claim 12, wherein adjusting the operational regime of the computer system includes adjusting a power management feature of the computer system.

14. The computer-readable storage medium of claim 9, further including:
- monitoring performance parameters of a set of power supplies, wherein the power supply is in the set of power supplies, and power supplies in the set of power supplies are in computer systems in a set of computer systems;
- predicting the remaining useful life of power supplies in the set of power supplies based on the monitored performance parameters for the set of power supplies; and
- adjusting an operational regime of the power supply based on the predicted remaining useful life of power supplies in the set of power supplies.

15. The computer-readable storage medium of claim 14, further including:
- monitoring performance parameters of a set of power supplies, wherein the power supply is in the set of power supplies, and power supplies in the set of power supplies are in computer systems in a set of computer systems;
- predicting the remaining useful life of power supplies in the set of power supplies based on the monitored performance parameters for the set of power supplies; and
- prioritizing a repair action for a power supply in the set of power supplies based on the predicted remaining useful life of power supplies in the set of power supplies.

16. The computer-readable storage medium of claim 15, further including prioritizing the repair action based on at least one of: the number of available spare power supplies, the time required to replace the power supply, and a power requirement of computer systems in the set of computer systems.

17. The computer-readable storage medium of claim 9, wherein the performance parameters include at least one of:
- a temperature of the power supply;
- an input current of the power supply;
- an input voltage of the power supply;
- an output current of the power supply;
- an output voltage of the power supply; and
- a telemetric impulsional response fingerprint.

18. An apparatus that prolongs a remaining useful life of a power supply in a computer system, the apparatus comprising:
- a monitoring mechanism configured to monitor performance parameters of the power supply, wherein the monitoring mechanism is further configured to systematically monitor and record a set of performance parameters, wherein the recording process keeps track of the temporal relationships between events in different performance parameters;
- a predicting mechanism configured to predict the remaining useful life of the power supply based on the monitored performance parameters; and
- an adjusting mechanism configured to adjust an operational regime of the power supply based on the predicted remaining useful life to prolong the remaining useful life.

* * * * *